(12) United States Patent
Verrall et al.

(10) Patent No.: US 8,995,783 B2
(45) Date of Patent: Mar. 31, 2015

(54) SYSTEM FOR PHOTOGRAPH ENHANCEMENT BY USER CONTROLLED LOCAL IMAGE ENHANCEMENT

(71) Applicants: Stephen Michael Verrall, Carlsbad, CA (US); Kalin Mitkov Atanassov, San Diego, CA (US); Adrian Giura, San Diego, CA (US)

(72) Inventors: Stephen Michael Verrall, Carlsbad, CA (US); Kalin Mitkov Atanassov, San Diego, CA (US); Adrian Giura, San Diego, CA (US)

(73) Assignee: Qualcomm Incorporation, San Diego, CA (US)

( * ) Notice: Subject to any disclaimer, the term of this patent is extended or adjusted under 35 U.S.C. 154(b) by 269 days.

(21) Appl. No.: 13/622,954

(22) Filed: Sep. 19, 2012

(65) Prior Publication Data

US 2014/0079334 A1    Mar. 20, 2014

(51) Int. Cl.
*G06K 9/40* (2006.01)
*H04N 5/232* (2006.01)
*H04N 5/235* (2006.01)

(52) U.S. Cl.
CPC ......... *H04N 5/23216* (2013.01); *H04N 5/2355* (2013.01)
USPC ....................................................... 382/274

(58) Field of Classification Search
USPC .................. 382/255, 274, 282, 284, 311, 312
See application file for complete search history.

(56) References Cited

U.S. PATENT DOCUMENTS 5,990,901 A    11/1999  Lawton et al.
8,050,512 B2   11/2011  Daly et al.
2006/0204124 A1   9/2006  Aihara
2009/0256947 A1*  10/2009  Ciurea et al. ............. 348/333.12
2012/0082379 A1   4/2012  Yu et al.

FOREIGN PATENT DOCUMENTS

EP          2110738 A2      10/2009
WO     WO2011042229 A1      4/2011
WO     WO2011093994 A1      8/2011

OTHER PUBLICATIONS

Banterle, et al., "Expanding low dynamic range videos for high dynamic range applications," Proceedings of the 24th Spring Conference on Computer Graphics (SCCG 2008), Budmerice, Slovakia, Apr. 21-23, 2008, pp. 33-41.
Kelly, "When to use the iPhone 4's HDR feature," Sep. 24, 2010, Macworld.com, retrieved from URL: http://www.macworld.com/article/1154308/hdrdosanddonts.html.
International Search Report and Written Opinion—PCT/US2013/059887—ISA/EPO—Jan. 3, 2014.

* cited by examiner

*Primary Examiner* — Phuoc Tran
(74) *Attorney, Agent, or Firm* — Knobbe Martens Olson & Bear LLP (57) ABSTRACT

In photography, High Dynamic Range (HDR) technology typically consists of (1) acquiring a wide dynamic range image and (2) adapting the wide dynamic range image to fit to the display range of the device. The first part can be achieved by using a special sensor or by combining two or more images with same or different exposures, and is optional. The second part, contrast adaptation, locally adapts the tone mapping function thus effectively re-using the available range. Described is a system and method that enables a user to create a new image by selectively combining contrast adapted and non-contrast adapted versions of the same image. The new image can retain the natural quality of the well illuminated areas and enhance salient features as selected by the user.

23 Claims, 6 Drawing Sheets

SYSTEM FOR PHOTOGRAPH ENHANCEMENT BY USER CONTROLLED LOCAL IMAGE ENHANCEMENT

BACKGROUND

1. Field of the Invention

The present invention generally related to systems and methods for photographic enhancement by blending of contrast adapted and non-contrast-adapted versions of the same image.

2. Background

Many current devices are available for capturing images. For example, current digital cameras and modern cell phones and tablets can all capture and display digital images to a user. In more cases, these devices capture images using a predefined dynamic range of illumination across the entire captured image. For example, these cameras may capture images at a preselected exposure level and a predefined contrast range.

In digital photography, High Dynamic Range (HDR) technology enables photographers to capture a greater range of tonal detail by capturing a greater dynamic range between the lightest and the darkest areas of a captured image. The dynamic range of the real world is large, and can usually be more than five orders of magnitude at the same time. The dynamic range of everyday scenes can hardly be recorded by a conventional sensor. Hence, a conventional image may contain portions that are over-exposed or under-exposed. HDR imaging techniques allow the possibility to reconstruct a radiance map that covers the full dynamic range by combining multiple exposures of the same scene. For example, HDR technology may be used to bring out detail in a dark foreground object set against a bright background. High Dynamic Range (HDR) technology typically consists of (1) acquiring a wide dynamic range image and (2) adapting the wide dynamic range image to fit to the display range of the device. The first part can be achieved by using a special sensor or by combining two or more images with the same or different exposures. The second part locally adapts the tone mapping function to the display range of the device, thus it effectively enables local re-use of the available range. The second part, contrast adaptation, may be done without the first part; therefore the first part is considered to be optional.

However, a captured scene is often well illuminated with the exception of some salient areas, such as a face or other important element. Adapting the whole image may be undesirable since natural backgrounds such as foliage, land, and ocean have pre-stored representations in the brain and artificially changing the contrast may change the image perception.

SUMMARY

In one embodiment, the invention provides a method of generating a hybrid image from a non-contrast adapted and a contrast adapted version of the same image. The adaptation area is specified by the user in order to limit the correction to only desired areas of the image. The method comprises providing a non-contrast adapted image on a screen, sensing selection of an area of the non-contrast adapted image, comparing the area of the non-contrast adapted image to the same area of the HDR contrast adapted version of the same image, and creating the hybrid image by altering the area of the non-contrast adapted image based on the area of the contrast adapted image.

DETAILED DESCRIPTION

As discussed above, HDR photography is a method used in photography to allow a greater dynamic range between the darkest and lightest areas of an image compared to traditional digital or photographic methods. Traditional cameras take pictures at a single exposure level with a limited range of contrast. This results in a loss of detail for bright or dark areas in a picture. High Dynamic Range (HDR) technology typically consists of two stages. The first stage is the acquisition of a wide dynamic range image using a special sensor. The second stage is adaptation of the wide dynamic range image to fit to the display range of the device on which the image is rendered. The first stage can be achieved either by using a special sensor or by combining two or more images with same or different exposures. The second stage adapts the tone mapping function locally to the display range of the device and therefore effectively re-uses the available range. The second stage, contrast adaptation, can be performed on any image, independently from the first stage. Therefore the first stage is optional. We describe an image before the second stage as non-contrast adapted and an image after the second stage as contrast adapted.

However, the downside of HDR imaging is that HDR images can often look unrealistic or unnatural when compared to a traditional photograph taken at a single exposure. A captured scene is often well illuminated with the exception of some salient areas, such as a face or other important element. Adaptation of the entire image can be undesirable since natural backgrounds such as foliage, land, and ocean have pre-stored representations in the brain and artificially changing the contrast can change the image perception. As discussed below, embodiments of the invention provide a standard image enhancement system that allows a user to create a new image by selectively enabling and specifying the aggressiveness of the contrast adaptation. In one embodiment the adaptation area is specified by the user in order to limit the correction to only desired areas. In one embodiment, the system allows a user to combine portions of contrast adapted and non-contrast adapted versions of the same image together to make a more appealing image that shows a higher contrast in some areas, but retains a more natural looking contrast in other areas. The overall result is a more natural looking image with only selected regions of the image emphasized by contrast adaptation.

Embodiments of the present invention generally relate to enhancing a photograph by blending of contrast adapted and non-contrast adapted versions of the same image. An image post-processing technique is described herein that enables a user to create a new hybrid image by defining where to merge or blend regions of the contrast adapted image to the non-contrast adapted image, and how aggressively. In some cases, this merging or blending can be accomplished on a device with a touchscreen by allowing the user to select the regions of the non-contrast adapted image to be enhanced. The touchscreen technique is referred to herein as "touch HDR".

In one embodiment, the user may use a touchscreen-type tablet computer or cell phone having the standard image enhancement system discussed herein. During image capture, the system captures a standard (non-HDR) image, and also generates a contrast adapted image of the same scene, either by processing HDR images or by processing the standard image. The standard image can be displayed to the user. By reviewing the image, the user can see that specific darker areas of the image could be enhanced by replacing the darker areas with a contrast adapted image in that section of the image. Similarly, the user can see that certain bright sections of the image appear washed out and overexposed in the image. The user would activate the standard image enhancement system, and then may use their finger to draw an outline in the dark areas and light areas of the image that could be enhanced. The system could then calculate the boundaries of the outlined areas and retrieve the same bounded areas from the contrast adapted image. The system could then apply the contrast adapted image areas to the standard image areas as a complete replacement, or merge the contrast adapted image with the standard image in order to blend the new images more seamlessly with the standard image.

In one embodiment, the user is allowed to choose how much of the contrast adapted image to blend into the standard image by tapping a certain number of times within the selected boundary that was defined on the standard image. The standard image is only blended with the contrast adapted image inside the selected boundary. For example, tapping one time within the boundary region could cause a merger wherein the final image comprised 90% of the standard image, and 10% of the contrast adapted image. However, each additional tap within the boundary would cause the percentage of the contrast adapted image in the final image to rise by, for example, 10%. Thus, if the user tapped three times, the resultant image would have 30% of the contrast adapted image and 70% of the original standard image. This flexibility allows the user to choose how much or how little of the contrast adapted image to merge or blend with the original image so that the result is pleasing and natural looking to the user.

The technique may be performed using software embedded on a processor, including but not limited to a personal computer, a touch screen tablet PC, or a laptop computer. High Dynamic Range (HDR) technology enables photographers to capture a greater range of tonal detail. High Dynamic Range (HDR) technology typically consists of (1) acquiring a wide dynamic range image and (2) adapting the wide dynamic range image to fit to the display range of the device. The first part can be achieved by using a special sensor or by combining two or more images with same or different exposures, and is optional. The second part locally adapts the tone mapping function thus effectively re-using the available range. A captured scene is often well illuminated with the exception of some salient areas, such as a face or other important element such as an advertisement. Adapting the whole image can be undesirable since natural backgrounds such as foliage, land, and ocean have pre-stored representations in the brain and artificially changing the contrast can change the image perception. The touch HDR system enables the user to specify the adaptation area in order to limit the correction to only desired areas. It also enables the user to specify the adaptation aggressiveness and decay range. For example, one may want to enhance the tonal detail of a subject's face. Another example may be to brighten a specific region of a non-contrast adapted image to bring attention to a particular feature, such as an advertisement. The combination of the contrast adapted and non-contrast adapted versions of the same image may be performed as a post-processing step. For example, the combining may be implemented as a feature of a photo editor application to be performed at any time after the image has been captured.

The touch HDR system allows post-processing of an image where contrast adapted and non-contrast adapted versions of the same image are both available. As explained above, it is not necessary for the non-contrast adapted image to be captured using an HDR capable camera. Therefore, the present invention is not solely limited to HDR image acquisition.

Figure 1:
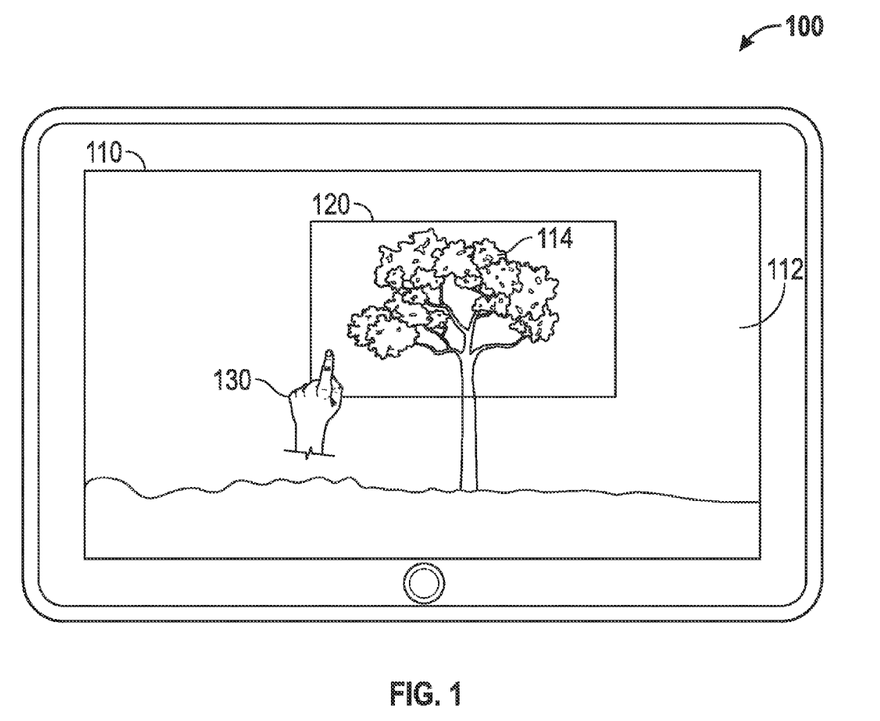
FIG. 1 is an illustration of one embodiment of a touch screen showing a finger selecting a region of an image to apply a contrast adaptation effect onto an image.

FIG. 1 is an illustration of a tablet 100 running the standard image enhancement system according to one embodiment. The tablet 100 includes a touch screen 110 that is configured to detect a user's finger touch. The touch screen 110 provides one means for receiving input from a user. As shown, an image 112 of a landscape having a tree 114 outlined by a border region 120 is illustrated. A finger 130 is shown selecting a portion of the tree 114 within the border region 120 to apply an "HDR effect". The image displayed on the screen, outside the region 120, is a non-contrast adapted image. The user's finger 130 is shown touching within the boundary region 120 to apply the contrast adaptation effect onto the specific region of the image (e.g., a tree).

As can be envisioned, the boundary 120 could have been defined by use of the finger 130 to outline the area, or by selecting corners of a predefined shape that can be moved and changed to cover the desired region of the standard image that needs to be enhanced. The regions of the image displayed on the touch screen 110 inside the boundary 120 may have contrast adaptation applied to them, with the proportion of contrast adaptation that is applied to the standard image to be determined by a "touch weight", as described in more detail below. As discussed below, the "weight" of the touch is the amount of contrast adapted image that is chosen to be replaced or merged with the standard image. For example, a high touch weight would result in a relatively large percentage of the standard image to be replaced by the contrast adapted image, whereas a low touch weight would result in a relatively small percentage of the standard image being replaced by the contrast adapted image. The touch weight may be applied uniformly or non-uniformly across the area within the boundary 120, depending on the settings within the system.

Figure 2:
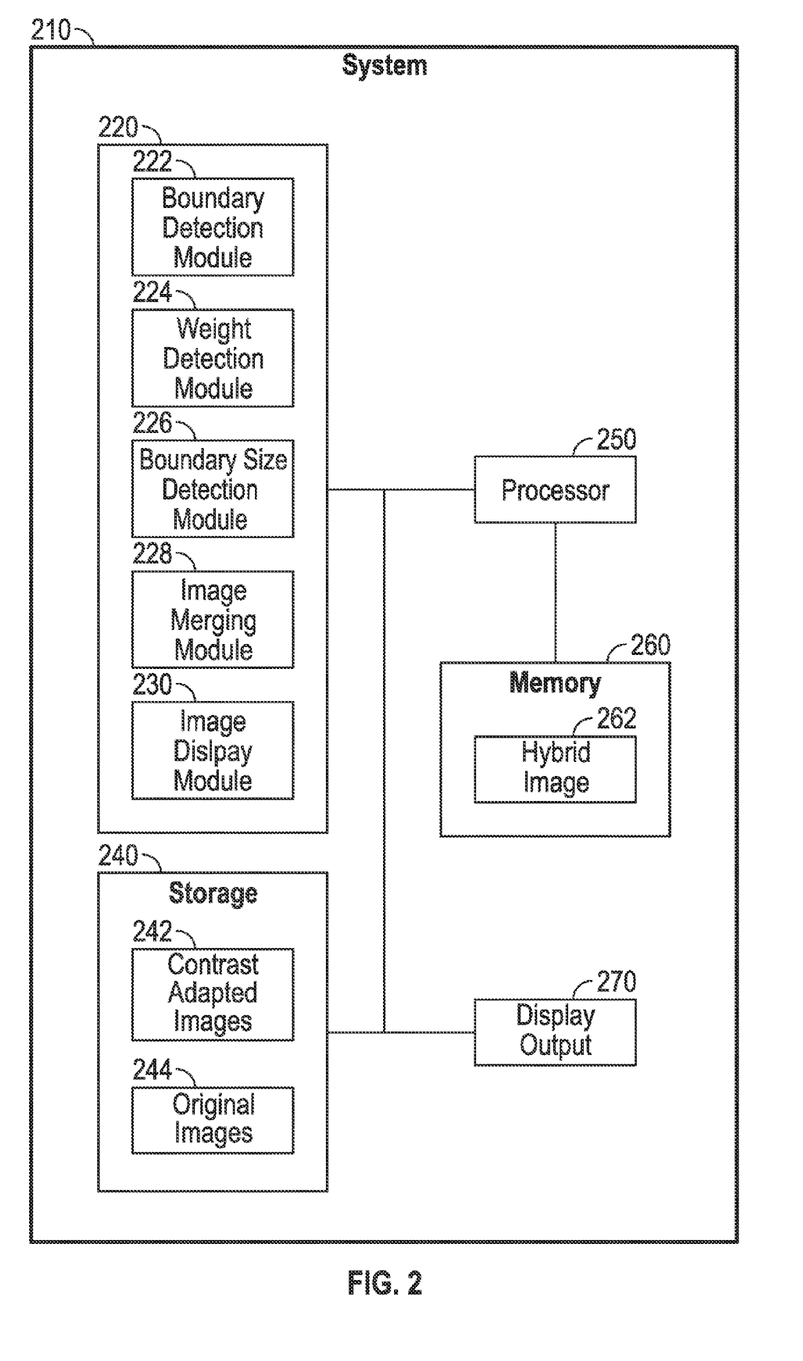
FIG. 2 is a block diagram of a system level overview according to one embodiment of the present invention.

FIG. 2 is a system level overview of a system 210, which may be similar to the tablet 100 of FIG. 1, according to one embodiment of the invention. A set of system modules 220 is shown that act together within the system to provide many of the functions of the standard image enhancement system. A boundary detection module, 222, is responsible for detecting the user-selected boundary that is created on the display screen of the system 210. The boundary detection module is configured to detect the position of the boundary defined by the user and match that boundary or contour to a non-contrast adapted image that will have a contrast adapted image applied to it. The on-screen location of the boundary, or contour region, is also detected using the boundary detection module. In one embodiment, the boundary may be detected on a touch screen of a tablet or cell phone, as it becomes defined by tracking movement of a user's finger on the touchscreen. Alternatively, the boundary may be selected via a predefined set of boundary profiles. Examples of pre-defined boundary profiles include, but are not limited to, a circle, a box, a cylinder, or other predefined shapes that can be applied to the image by the user. More details on the process for defining and detecting a boundary can be found below with reference to FIG. 4.

A weight detection module 224 within the set 220 determines the amount, or proportion, of a contrast adapted image that is to be added inside the boundary region determined by the boundary detection module 222. In one embodiment, the amount of weight given to a particular contrast adapted image is determined by detecting the number of taps or clicks within the chosen boundary by the user. However, the weight of each touch, or click, may depend on the touch configuration settings. The configuration settings may be changed at any time during the sequence of touches. For a uniform touch profile wherein the same weight of touch is evenly distributed across the chosen boundary, the touch weight is applied uniformly. For non-uniform touch profiles, the touch weight may decrease smoothly from the center of initial touch by the user on the touchscreen. The touch weight may be additive such that if the touch weight is configured to be 0.2, five touches at the same image location will result in a total touch weight, W, equal to 1. The touch weight, W, may range in value from 0 to 1, where a value of 0 represents no contrast adaptation applied to the non-contrast adapted image, and a value of 1 represents the complete addition of the contrast adapted image being applied within the boundary region.

Moreover, the user or system may choose how to apply the designated weight to merge the contrast adapted image with the standard image. For example, the system may provide a uniform weighted box shape and define that a uniform touch weight may be applied over that box shaped region of the image. The system may also have a cylindrical shape, wherein a uniform weight may be applied over a circular region of the image. The system may also provide a bell shape, wherein a non-uniform weight may be applied over a circular region of the image, where maximum weight is applied to the center, and the weight tapers off radially from the center according to a Gaussian function. For non-uniform weights, embodiments of the invention are not limited to distributing weights as a Gaussian function. Other function, such as non-Gaussian functions are also contemplated. The weight of the boundary region determines "how much" HDR effect will be added to the region. The non-uniform profiles result in soft, continuous boundaries, whereas uniform profiles result in hard, discontinuous boundaries. Any uniform weight geometry can be transformed into non-uniform weight geometry by convolution. For example, the hard edges of a box may be tapered by applying a half bell profile along each side. More specifics on detecting and applying weight values to an image can be found with reference to FIG. 5 below.

Within the module set 220 is also a boundary size detection module 226 that is directed to defining the dimensions of a predefined boundary profile in the image plane. The boundary size detection module 226 is applicable to the boundaries that are specifically pre-defined, wherein the user selects from a list a pre-defined boundary shape (e.g., the shape may be a cylinder, bell, box, etc.), and then defines the size of the pre-defined boundary shape. For example, for a cylindrical shaped profile, touch size may define the radius of the circle. For a bell shaped profile, touch size may define the diameter of the circle where one diameter corresponds to a multiple of the standard deviation. Touch size may be defined in absolute terms (such as number of pixels) or as a proportion of the image's height or width. Once the user has defined the boundary size, the user still has the option to modify the overall size of the boundary profile. More specifics on the process for defining and detecting a boundary can be found below with reference to FIG. 4.

The image merging module, 228, is used to merge the standard image with the contrast adapted image within the boundaries defined by the user, and taking into account the weights determined for calculating how much of the standard image should be replaced by the contrast adapted image. The image merging module, 228, provides one means for comparing the areas of the contrast adapted and non-contrast adapted images inside the user defined boundary region. The image merging module 228 takes the region within the boundary of the non-contrast adapted image, and replaces it with the contrast adapted image to a greater or lesser extent depending on the weight of the contrast adapted image to apply. The boundary profile as defined by the boundary detection module 222 defines the area of the non-contrast adapted image that will be replaced with the contrast adapted image.

The amount of the non-contrast adapted image inside the boundary that is replaced by the contrast adapted image is calculated based on the total weight, W. The total weight W is determined by the user, and is discussed in greater detail below with respect to FIG. 5. For example, if the total weight W (on a scale of 0 to 1 inclusively is a maximum of 1 inside the boundary region uniformly (uniformly means a weight of 1 covers the entire area inside the boundary region), then the area inside the boundary region becomes 100% contrast adapted, with no non-contrast adapted component inside the boundary area. In another example, if the total weight W is a value of 0.8 inside the boundary region uniformly (uniformly means a weight of 0.8 covers the entire area inside the boundary region), then the area inside the boundary region becomes 80% contrast adapted and remains 20% non-contrast adapted, so the area inside the boundary area is a "blend" of both non-contrast adapted and contrast adapted versions of the same image.

In one embodiment, the area outside of the selected boundary area remains completely non-contrast adapted and is unchanged. One image may comprise several boundary regions that have been defined by the user, and used to merge several portions of a contrast adapted image with the standard image.

In some embodiments, the weighting applied to the boundary area selected by the user is non-uniform, and thus the value of the weight W applied inside the boundary region is not even. In other words, the value of W may vary from, for example, the center region of the boundary area to the outside region of the boundary area. In some cases, the weight applied to the center of the boundary may be higher than the weight applied to the outer regions of the boundary. In other cases, the weight applied in the center of the boundary may be less than the weight applied to the outer regions of the boundary. Therefore, for non-uniform profiles, the amount of contrast adapted image that is merged with the non-contrast adapted image inside the boundary region varies (some areas inside the boundary region may be 90% contrast adapted and 10% non-contrast adapted, some might be 75% contrast adapted and 25% non-contrast adapted, etc.). The image merging module 228 will determine how much of the contrast adapted image to apply inside the boundary region based on the value of W at different points inside the boundary.

The image merging module is connected to a storage module 240, which comprises a database of contrast adapted images 242 and their non-contrast adapted counterparts, or original images 244. The database of contrast adapted images 242 contains the exact same images of the original images 244, but with contrast adaptation applied. The image merging module 228 may retrieve the user-selected original image and corresponding contrast adapted image. The image display module 230 may display the user-selected non-contrast adapted image and/or contrast adapted version of the image on the screen or display output 270. The image display module 230 may comprise a display processor as one means for displaying an image on the screen or display output 270.

A processor 250 may be connected to the set of system modules 220, and the database of images 240, to provide a means for creating a hybrid image 262 using the boundary, weight, and size information from modules 222, 224, and 226 to determine how to properly merge the contrast adapted image and non-contrast adapted image together. Finally, a display output device 270 may display the hybrid image 262, as well as the corresponding contrast adapted and non-contrast adapted image used to create the hybrid image. The system may also provide the ability to list, in various iterations, image tiles of the contrast adapted and non-contrast adapted images for the user to select that are available in storage 240.

Figure 3:
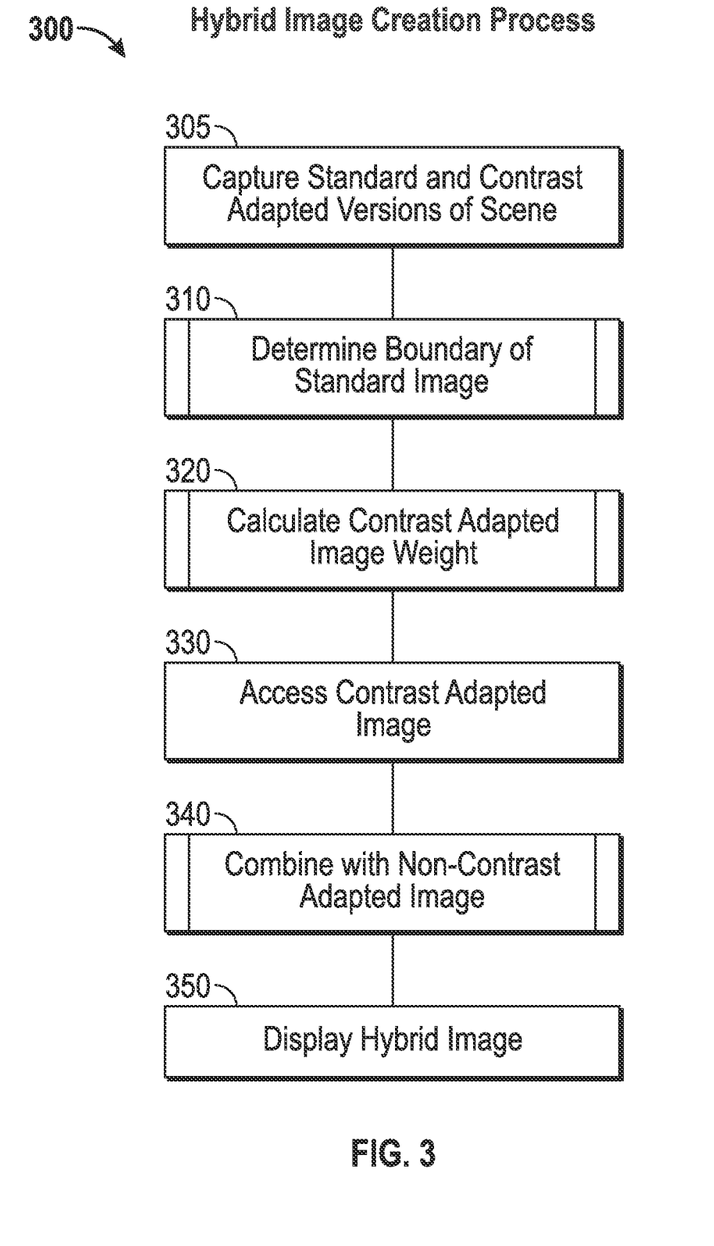
FIG. 3 is a flow diagram showing an overview of a hybrid image creation process.

FIG. 3 is a flow diagram showing one embodiment of a process 300 for taking a standard image and a contrast adapted image and creating a hybrid image as discussed herein. The process 300 begins at a state 305 when a user captures a standard and contrast adapted version of a scene of interest. This capture may happen simultaneously by capturing a standard image and, for example, multiple different exposure images of the scene of interest. The system may then compile the multiple exposure scenes together into one HDR image and adapt the HDR image to the display range of the device. Alternatively the system may adapt the standard image using local tone mapping. The process 300 then moves to a process state 310 wherein the boundary, or contour region that is selected by the user is determined for the standard image. This process is shown in more detail with reference to FIG. 4. Next, the process 300 moves to a process state 320 which calculates the contrast adapted image weight, to apply to the non-contrast adapted image within the boundary region determined at process state 310. The process 300 then moves to state 330 wherein the contrast adapted image that corresponds to the captured standard image is accessed from storage. Process state 340 then combines the user selected non-contrasted image, $S_{ORIG}$, and contrast adapted version of the same image, $S_{HDR}$, together using the boundary and weight information determined by processes 310 and 320, respectively to create the hybrid image $S_{HYB}$. Given the original non-contrasted adapted image, $S_{ORIG}$, and the contrast adapted version of the same image, $S_{HDR}$ (with the same image dimensions as $S_{ORIG}$), the hybrid image $S_{HYB}$ may be generated by combining $S_{ORIG}$ and $S_{HDR}$ with a weighting surface W, as follows:

$$S_{HYB}=(1-W)*S_{ORIG}+W*S_{HDR}=S_{ORIG}-W*S_{ORIG}+W*S_{HDR}$$

The weighting surface W has the same image dimensions as $S_{ORIG}$ and $S_{HDR}$ and is generated by the actions of the user. The weight applied to the contrast adapted image at image coordinate (x,y), W(x,y), has a continuous value in the range 0 and 1. Typically, the initial value of W is 0 everywhere, so that the hybrid image is initially identical to the original image. The user then defines W indirectly by performing a sequence of touches, or clicks. In the context of a touch screen computer, a touch may be a tap on the screen. In the context of a mouse interface, a touch may instead be a click of the mouse button. The touches or clicks on the screen may be implemented such that the touches or clicks may be performed anywhere on the screen to implement the HDR effect inside the boundary region. Finally, the process 300 then moves to state 350 which displays the hybrid image on an output device.

Figure 4:
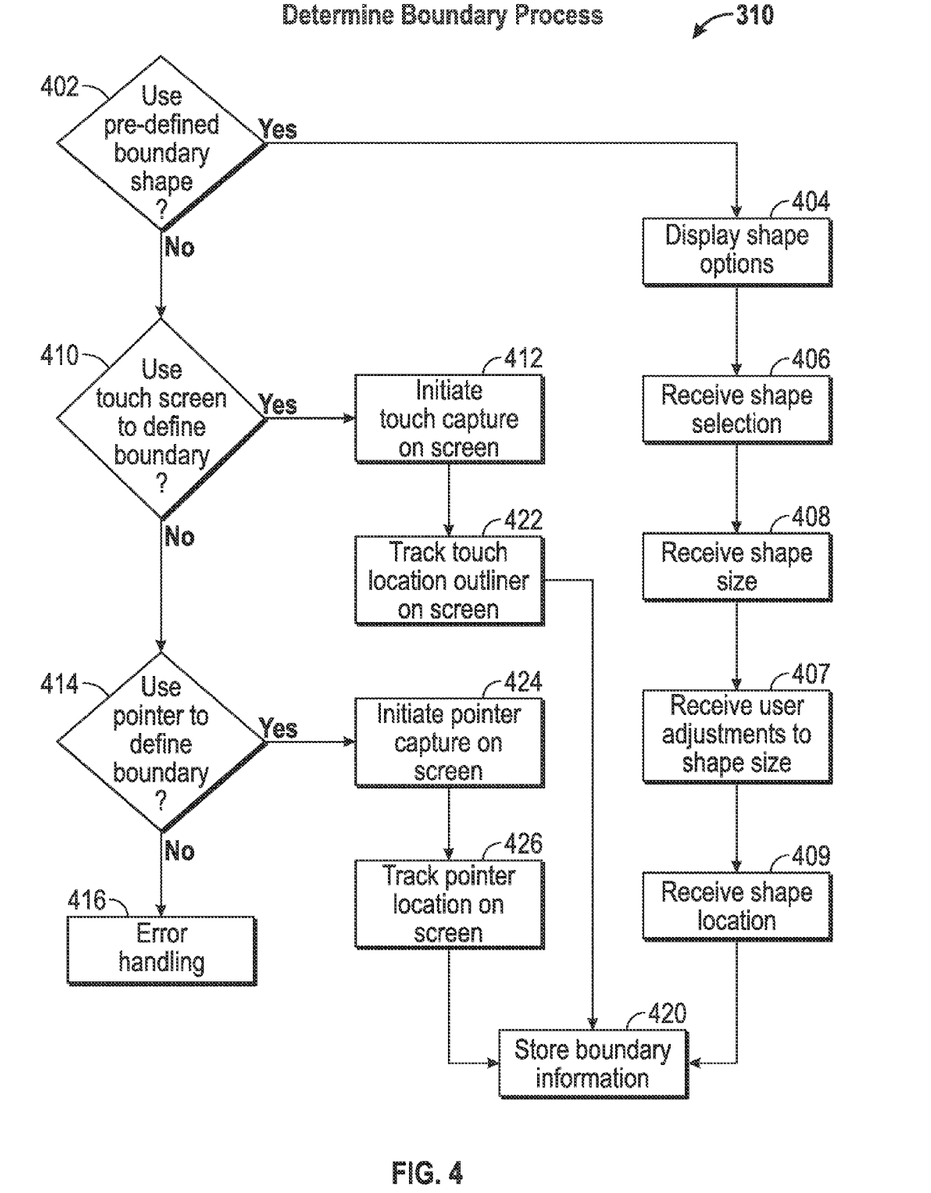
FIG. 4 is a flow diagram showing an overview of a process for determining a boundary

FIG. 4 illustrates in further detail the process state 310 for determining a boundary. In first decision block 402 a determination is made whether or not a pre-defined boundary shape will be used to define the boundary region. In this decision block 402, the system determines whether or not the user has elected to use a pre-existing list of boundary shapes, or create a custom boundary shape. If the user decides to select from a pre-existing list of boundary shapes, such as but not limited to a box, cylinder, or bell, the process 310 moves to a block 404 wherein a display of shape options is presented to the user which will allow the user to select which boundary shape to use. Next, the process 310 receives the user's selected shape in block 406. Once the boundary shape has been selected in block 406, the process 310 moves to block 408 wherein the user can decide to select the size of the selected shape. For example, for a box shape, the user may enter the length and width of the box. The size may be defined in absolute terms, such as pixels, or as a proportion of the total image's height or width. The process 310 continues to block 407, wherein user adjustments to the shape size are received by the system. This enables the user to adjust the size of the pre-defined boundary profile. The size of each boundary may be adjusted via touch, as performed on a touch screen by a user's finger or multiple fingers, or may be adjusted via a computer mouse on a traditional desktop or laptop computer system.

For example, in one embodiment, the user may touch and drag one corner of the boundary with a finger in order to stretch that portion of the boundary in a desired direction. Alternatively, the user may use a mouse to select one portion of the boundary and move or stretch that portion of the boundary in order to adjust the boundary size.

Once the boundary has been adjusted to the proper size at the block 407, the process 310 receives the shape location in block 409 of where the pre-defined shape is located on the screen, which may be input by the user by clicking or touching the screen at the desired location, or the location may be input as a coordinate location. The location of the boundary region may also be modified by dragging the entire boundary region via the user's finger on a touch screen, or by dragging the boundary region via a computer mouse. The user may touch with their finger or click on the boundary region with a computer mouse at any region inside the boundary region to move the boundary to different areas of the image. Finally, once the location of the shape has been received at block 409, the process 310 moves to stores the boundary information in a computer memory as shown in block 420.

Referring back to the decision block 402 of determining whether or not the user wishes to select from a pre-existing list of boundaries, or create a custom boundary, if the user decides not to use a predefined boundary shape the process 310 moves to decision block 410 to determine whether or not the user is using a touch screen to define the boundary. If the user is using a touch screen, the process 310 initializes capture of the user's finger on the screen at a block 412. As the user's finger moves along the touch screen to create a closed contour or boundary shape, the outline is captured and tracked in by a process running at block 422 which tracks the touch locations by the user, including the location of the contours created by the user. After the touch location has been tracked at the block 422, the process 310 moves to the block 420 where the boundary information may be stored in memory.

Referring back to using a touch screen to define the boundary in decision block 410, if the user is not using a touch screen, the process 310 moves to a decision block 414 to determine if the user is using a pointer to trace a closed contour. If a determination is made that the user is using a pointer, the process 310 then initializes capture of the pointer at a block 424. In one embodiment the capture may be initiated by placing a mouse in a clicked position. In another embodiment the mouse may be initiated by placing the mouse in an unclicked position to create a closed contour. The process 310 then moves to block 426 wherein the location of the pointer and contour may also be tracked while the user traces the boundary on screen. Finally, the boundary information may be stored in memory 420. In the circumstance wherein the user is not using a touch screen or a pointer to define the boundary, the process 310 may move to block 416 which manages any error handling.

Figure 5:
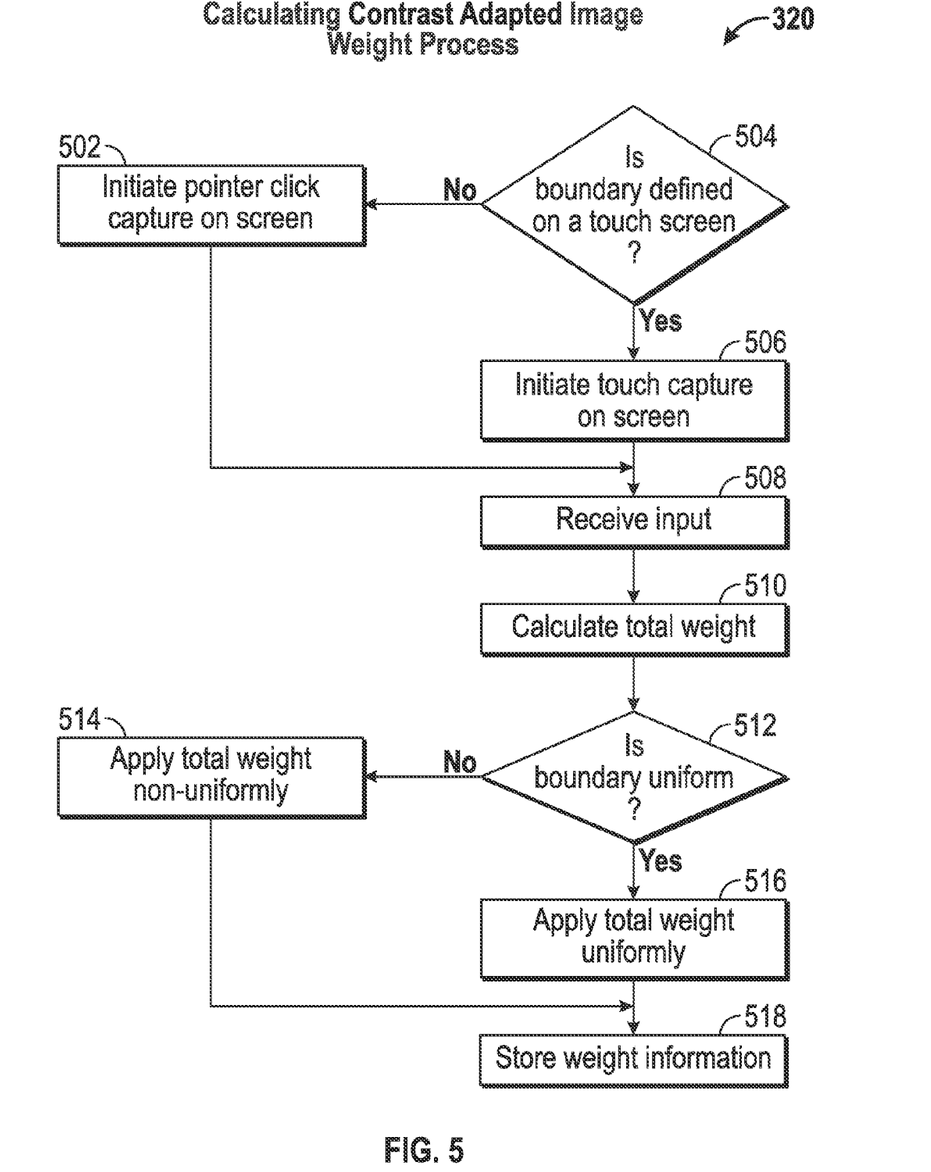
FIG. 5 is flow diagram showing an overview of a process for calculating a contrast adapted image weight

FIG. 5 reviews in further detail the process 320 for calculating the contrast adapted image weight to be applied to a non-contrast adapted image. The contrast adapted image weight determines how much of the contrast adapted image is applied to the non-contrast adapted image inside the boundary region defined in process 310.

For a uniform profile, the image weight is applied the same inside the boundary region, so the amount of the non-contrast adapted image that gets replaced with the corresponding region of the contrast adapted image is the same throughout the boundary region. In applying the weight, the percentage of contrast adaptation to apply to the standard image is determined by the total weight W defined by the user.

Conversely, for a non-uniform profile, the amount of the non-contrast adapted image that gets replaced with the corresponding region of the contrast adapted image is not the same throughout the boundary region, wherein some areas of the boundary region may have a greater portion of the contrast adapted image than others. For example, the center portion of the bounded region may have more contrast adaptation applied than the more peripheral portions of the bounded region. For non-uniform profiles, the user may also define the total weight W, but the value of the weight can vary inside the boundary region from one portion to another. Referring now to FIG. 5, the process 320 starts at a decision block 504 to determine whether the boundary was created on a touch screen. If the boundary was created on a touch screen, the process 320 moves to a block 506 to initialize capture of the user's touch on the screen to define the weight information. Conversely, if a determination is made at the decision block 504 that a touch screen was not used to create the boundary, or closed contour, the process 320 initializes capture of pointer clicks in block 502 for the user to input weight information.

Next, the process 320 receives the input from the user in block 508, either as a sequence of touches or clicks captured by the touch screen, to determine how much HDR effect to apply inside the closed contour or boundary. As noted earlier, the user may define the weight that a single touch or click will have by setting preselected weight threshold values in the system. For example, if the touch weight is set to 0.1, the user may click or touch (touch via a series of screen taps), the screen to add 0.1 to the total touch weight, W. The value of the total touch weight, W, may range from 0 to 1, inclusively. In one embodiment, the maximum touch weight W is 1, so if the touch weight is set to 0.1, the user may tap or click the screen 10 times before reaching the maximum limit, where the maximum proportion of contrast adapted image is added inside the boundary region. Further taps or clicks will result in no impact to the boundary region.

Therefore, by setting the touch weight to 0.1, the user may tap the screen up to 10 times or less to select the desired amount of contrast adaptation. For finer range of HDR effect, the user may set the touch weight to, for example, 0.05, for up to 20 clicks or taps of adding contrast adaptation to the boundary region. Conversely, for a smaller range, the user may set the touch weight to 0.2, for up to 5 clicks or taps of adding contrast adaptation to the boundary region. After the user has completed tapping or clicking the screen, the total weight, W, is calculated in block 510. The process 320 then moves to a decision block 512 to determine how to apply the HDR effect inside the boundary region, whether to apply it uniformly or non-uniformly. Determining a uniform or non-uniform profile may be selected by the user.

Some of the pre-defined boundary shapes, as discussed above in process 310, include pre-selected weights to be either uniform or non-uniform. If the boundary region is uniform, then the process 320 calculates the total touch weight in block 510 and applies it uniformly inside the boundary region at a block 516. For example, if the boundary region is a box which is pre-defined to be uniform, the total weight W calculated in block 510 is applied evenly inside the boundary region. Conversely, if the boundary region is not uniform, the touch weight decreases smoothly from the center of the touch. For example, if the total calculated weight, W, in block 510 is calculated as 0.7, then for a non-uniform touch profile the center of the boundary or closed contour will have a weight of 0.7 (or 0.7 times the maximum amount of HDR effect to apply), and will decrease smoothly from the center of the touch to the edge of the boundary region. The algorithm for which the weight tapers off from the center may be calculated, but is not limited to, a Gaussian function. Finally, the weight information is stored in memory, in block 518.

Figure 6:
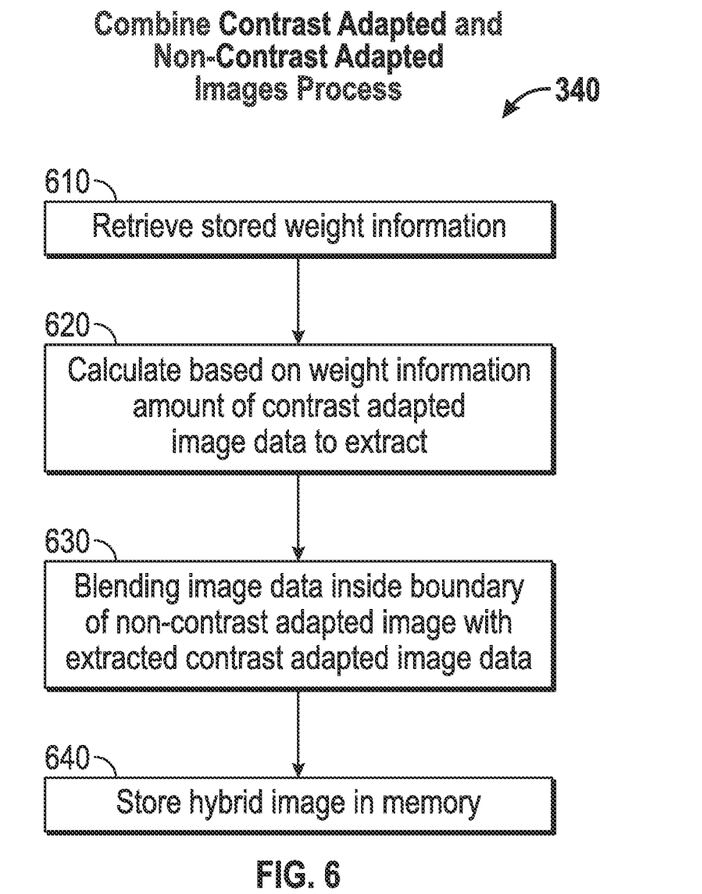
FIG. 6 is a flow diagram showing an overview of a process for combining a contrast adapted image with a non-contrast adapted image

FIG. 6 reviews in further detail the process 340 for combining a non-contrast adapted image with a contrast adapted image. The process 340 starts at a block 610 which is responsible for retrieving the stored weight information which is stored in memory as shown in block 518 discussed above with respect to FIG. 5. Once the weight information is retrieved, block 620 calculates based on the weight information, the amount of contrast adapted image data to extract from memory. Block 630 then blends the image data inside the boundary of the non-contrast adapted image with the extracted contrast adapted image data. The total weight W which was calculated in process 320 determines the amount of contrast adapted image data to extract. Finally, the hybrid image may be stored in memory as shown in block 640.

Pixels in the hybrid image are generated as follows:

$$P_{HYB}(x,y,c) = (1-W(x,y,c)) * P_{ORIG}(x,y,c) + W * P_{HDR}(x,y,c)$$

where P(x,y,c) is the value of channel c (R, G, or B) at image coordinate (x,y) and wherein R, G, and B represent the colors red, green, and blue, respectively The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, mini-computers, mainframe computers, distributed computing environments that include any of the above systems or devices, and the like.

As used herein, instructions refer to computer-implemented steps for processing information in the system.

Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of generating a hybrid image from a non-contrast adapted and a contrast adapted version of the same image, wherein the method comprises:
    providing a non-contrast adapted image on a screen;
    sensing selection of an area of the non-contrast adapted image;
    comparing the area of the non-contrast adapted image to the same area of the contrast adapted version of the same image; and
    creating the hybrid image by altering the area of the non-contrast adapted image based on the area of the contrast adapted image.

2. The method of claim 1, wherein the screen is a touch screen and wherein the sensing is performed by sensing a user's touch on a touchscreen.

3. The method of claim 1, wherein the sensing is performed by detecting movement of a computer mouse.

4. The method of claim 1, further comprising calculating a user-defined weighting factor that is defined by a sequence of touches on a touch screen within the selected area.

5. The method of claim 1, further comprising calculating a user-defined weighting factor that relates that is defined by a sequence of mouse clicks within the selected area.

6. The method of claim 4, wherein the weighting surface defines the amount of the contrast adapted image to apply to the area of the non-contrast adapted image.

7. The method of claim 5, wherein the weighting factor defines the amount of the contrast adapted image to apply to the area of the non-contrast adapted image.

8. The method of claim 1, wherein sensing selection of an area comprises sensing selection of a predefined profile defining the area.

9. The method of claim 8, wherein the size of the predefined profile is user-defined.

10. The method of claim 1, wherein the hybrid image is created by blending the non-contrast adapted image and contrast adapted image together.

11. The method of claim 10, wherein the blending is performed inside the boundary defined by the selection of area.

12. A system of generating a hybrid image from a non-contrast adapted and a contrast adapted version of the same image, wherein the system comprises:
    means for providing a non-contrast adapted image on a screen;
    means for sensing selection of an area of the non-contrast adapted image;
    means for comparing the area of the non-contrast adapted image to the same area of the contrast adapted version of the same image; and
    means for creating the hybrid image by altering the area of the non-contrast adapted image based on the area of the contrast adapted image.

13. The system of claim 12, wherein the means for providing a non-contrast adapted image on a screen comprises a display processor.

14. The system of claim 12, wherein the means for sensing selection of an area of the non-contrast adapted image comprises a touch screen computer configured to track a user's finger on the touch screen.

15. The system of claim 12, wherein the means for comparing the area of the non-contrast adapted image to the same area of the contrast adapted version of the same image comprises an image merging module.

16. The system of claim 12, wherein the means for creating the hybrid image is a programmed computer processor.

17. A system of generating a hybrid image from a non-contrast adapted and an contrast adapted version of the same image, wherein the system comprises:
    a boundary detection module for detecting a boundary area of the non-contrast adapted image to combine with the contrast adapted image;
    a weight detection module for detecting the amount of the contrast adapted image to combine with the non-contrast adapted image inside the boundary area;
    an image merging module to merge the non-contrast adapted image and contrast adapted image together inside the boundary area; and
    an image display module for displaying the hybrid image.

18. The system of claim 17, wherein the image display module comprises a touchscreen computer screen.

19. The system of claim 17, wherein the boundary area is defined by a user.

20. The system of claim 17, wherein the boundary area is pre-defined.

21. The system of claim 17, wherein the boundary detection module detects a finger's touch on a touchscreen computer.

22. The system of claim 17, wherein the boundary detection module detects a pointer of a computer mouse.

23. A non-transitory, computer readable media, comprising instructions that when executed by a processor, cause the processor to perform a method of generating a hybrid image from a non-contrast adapted and a contrast adapted version of the same image, wherein the method comprises:

providing a non-contrast adapted image on a screen;
   sensing selection of an area of the non-contrast adapted image;
   comparing the area of the non-contrast adapted image to the same area of the contrast adapted version of the same image; and
   creating the hybrid image by altering the area of the non-contrast adapted image based on the area of the contrast adapted image.

\* \* \* \* \*